United States Patent Office 3,451,038
Patented June 17, 1969

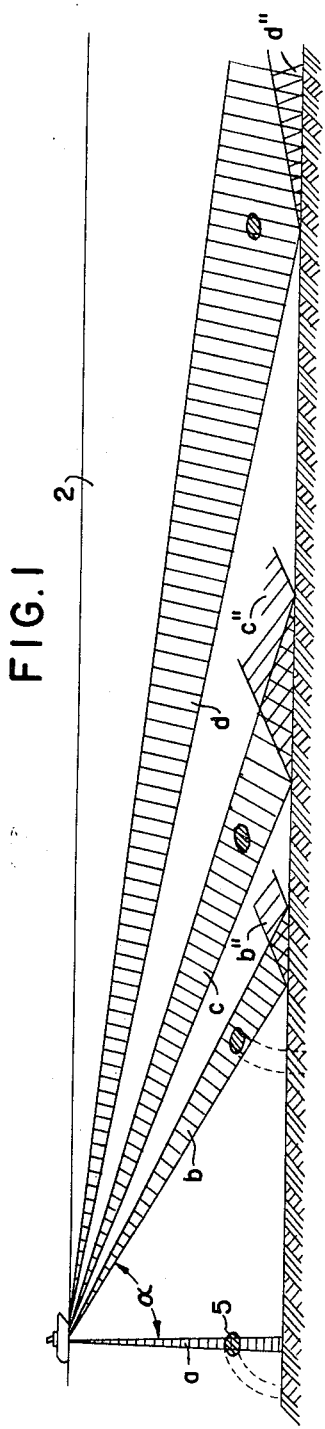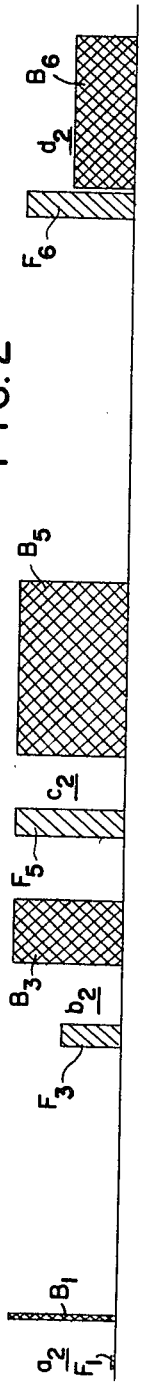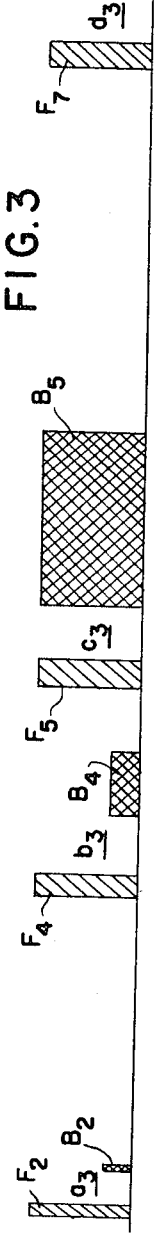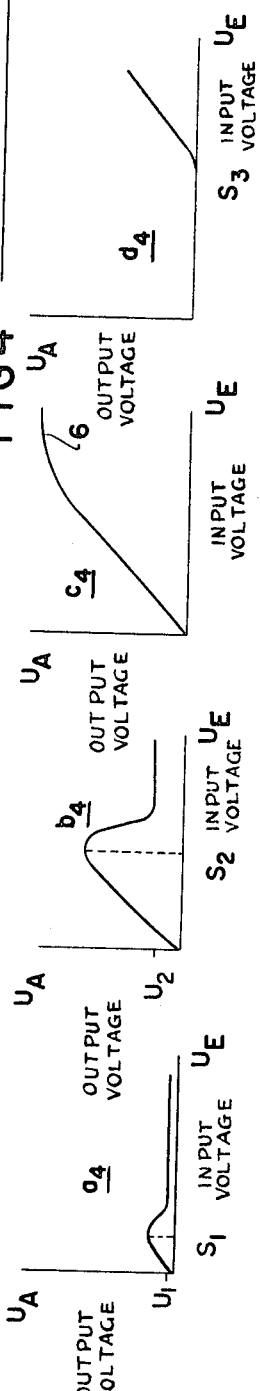

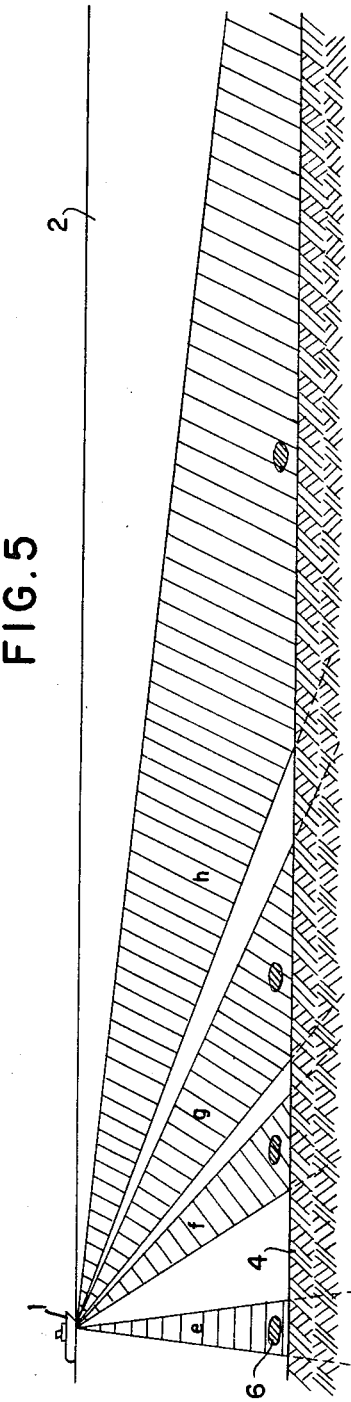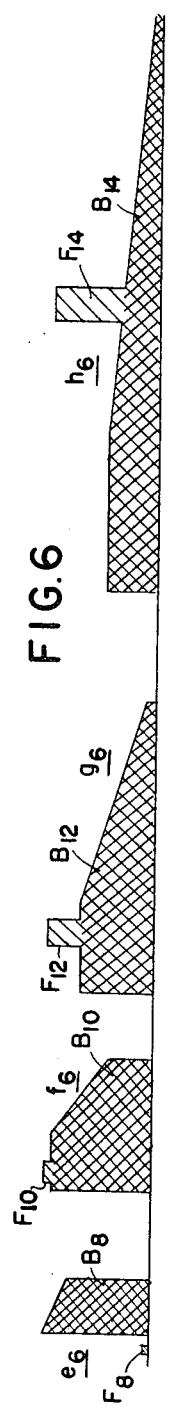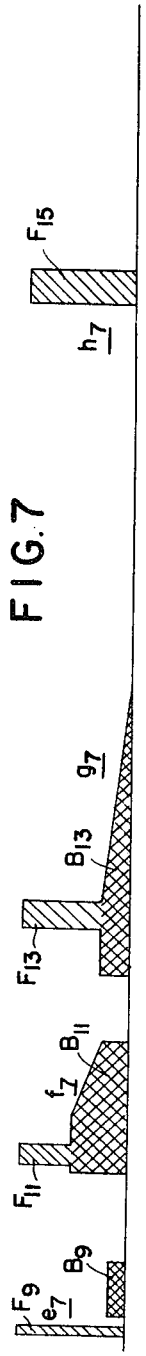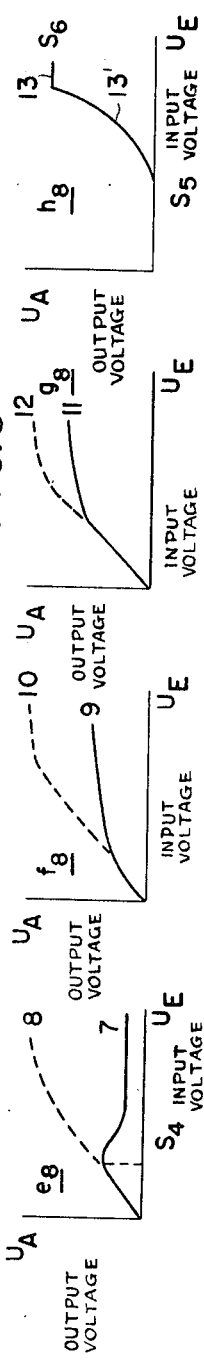

3,451,038
ECHO SOUNDING APPARATUS WITH ADJUSTABLE SOUNDING DIRECTION
Gustav Maass, Eutin, Germany, assignor to Electroacustic Gesellschaft mit beschrankter Haftung, Kiel, Germany, a corporation of Germany
Filed July 27, 1965, Ser. No. 475,067
Claims priority, application Germany, July 28, 1964, E 27,497
Int. Cl. G01s 9/66
U.S. Cl. 340—3
15 Claims

ABSTRACT OF THE DISCLOSURE

Underwater echo sounding apparatus includes a sonic-electric transducer. An amplifier system connected to the transducer receives echo voltages therefrom. The amplifier system comprises a control for varying the shape of the amplifying characteristic of the amplifier system. The amplifying characteristic is the output voltage versus the input voltage of the amplifier system. An indicator is connected to the amplifier system and is controlled thereby. A beam inclination control device changes the inclination angle of the sonic beam issuing from the transducer and the control is coupled to the inclination control device for adapting the amplifying characteristic to changes in sounding conditions caused by changes in beam inclination.

---

My invention relates to echo sounding and particularly to sonar equipment for use aboard ship.

Sonar equipment for horizontal soundings has found increasing application in the fishing industry to afford tracking schools of fish still relatively far away from the fishing vessel. Without the possibility of taking horizontal sounding, trawlers or cutters may pass by schools or herrings or menhadens fairly near the vessel without being able to detect such schools. Only too late does it occasionally happen that fishing vessels have missed the chance of catching such schools of fish, namely when another vessel makes a good catch which should have been made by the vessel inadvertently bypassing the school. The limits imposed upon conventional vertical sounding are strikingly manifested by occurrences of this kind.

For that reason, echo sounding apparatus have been equipped with tiltable transducers that can be set to an inclined sounding position for tracking the region about the vessel and for permitting continued tracking of a school of fish and simultaneously making any necessary corrections in the travel course of the vessel until the net reaches the school. Although the principle involved appears to be simple, the technological realization of such echo sounding equipment encounters severe problems. These are in part due to the requirement that the echo soundings must be indicated and recorded in sufficient detail. This is preferably done by producing a record on electrically sensitive chart paper on which the particular echo details of interest, such as fish located closely above the sea bottom, or any stratification of the sea bottom, should be clearly discernible.

Known for this purpose are electronic devices which entirely or partially suppress the more intensive bottom echo but not the echo stemming from a school of fish. These devices have the disadvantage that when the equipment is used for horizontal sounding at which the fish echo is the more intensive one, it is just this especially interesting echo which is being suppressed. Thought could be given to make such devices manually controllable by switching them on and off or by manually adjusting the amplifying gain or varying the sounding frequencies and other parameters. The provision and proper manipulation of such controls, hoyever, places exacting requirements upon the personnel. This will be understood if one takes into account that several different parameters would have to be controlled or adjusted by the helmsman or other observer and would have to be set to conjointly optimal settings within very short time. The parameters furthermore must be varied continuously during tracking and while the sonic transducer changes its angular positions in two planes, aside from the necessity of continuously evaluating the echogram for correcting the course of the vessel to steer it directly toward the school of fish.

It is therefore an object of my invention to secure a sufficiently detailed recording of the echogram, while fully preserving the adjustability of the sonic beam direction, even under conditions where a target is being searched and tracked by the sonic beam during continuous variation of the target position relative to the vessel.

Another object of the invention is to devise a sonar tracking system by virtue of which the helmsman or attending personnel of the fishing boat is never detracted from the main task, fishing, but is automatically assured an optimum of detailed echo recordings for any spacial position of a school of fish relative to the vessel.

A conjoint object of the invention is to prevent such errors as may otherwise result from the differences in resolving power of the echogram occurring in dependence upon positional changes of a school of fish relative to the vessel. For example, when previously the floating of a net toward a school of fish was observed by vertical sounding in order to simultaneously recognize fish located near the sea bottom, and if for this purpose a device for suppressing the otherwise overwhelming bottom echo was in operation, then it may have been forgotten during intensive fishing activities, that the same device remained active when thereafter searching for a new school of fish. If this happens, a school of fish located at a distance from the boat would be suppressed in the echogram instead of being emphasized. Consequently, such a school could not be observed on the echogram; and experience has shown that, since the fisherman during searching must place reliance upon his sonar equipment, he is apt to refrain from employing otherwise available auxiliary expedients. Hence under the conditions mentioned, he would be in a worse position than if he had no possibility of horizontal sounding. Consequently it is one of the more specific objects of my invention to give the fisherman the full possibility of always reliably detecting a school of fish far ahead of the vessel and to always have the opportunity of steering the boat and the net toward the school.

To achieve these objects and in accordance with a feature of my invention I provide underwater echo sounding apparatus of the type having a control device for varying the inclination angle of the sonic beam, with an echo-voltage amplifying system whose amplification characteristic is adjustable by electric control means which are coupled or adapted to be coupled with the beam inclination control device, so as to automatically adapt the gain or other amplifier characteristic to the changes in sounding conditions caused by a change in beam inclination.

As a result, the fisherman always receives reliable echograms containing an optimum of details for any spacial positions of schools of fish relative to the vessel, so that the school becomes catchable virtually when first entering into the region observable by means of the sonar equipment. The fisherman also is given sufficient time for setting the catching equipment with respect to the kind of fish detected.

According to another feature of my invention, I provide the echo sounding apparatus with adjusting or control means of the electronic type which vary the amplifying characteristic in dependence upon amplitude of the echo signal, and I couple these means with the device for changing the angular position of the sonic beam. Electronic devices of this kind, for example, are those which permit emphasizing or preferentially amplifying the echo stemming from given reflectors. Fish echoes, for example, can thus be amplified in preference to the bottom echo by means of a threshold device or by providing an electrical network, such as an RC network, which by virtue of its time constant causes short echo details to be more amplified than the bottom echo which has a longer duration. An electronic device may also be provided for adapting the dynamic range of the echo voltage to the given, narrow graduation range of an indicating or recording device. Suitable for such adaptation, for example, are a threshold device and/or a series resistor connected in the writing circuit, i.e. in the electric circuit which applies the amplified echo voltage to the electrically responsive chart paper of the recording device in order to produce the echogram thereupon. Such means may reduce the resolution of the recordings, but they afford simultaneously recording large amplitude differences of echo details within the few gray stages of the electrically sensitive recording paper. In any such case, the invention affords the advantage that the most favorable indicating or recording conditions, once chosen, will be substantially preserved automatically when passing from horizontal to vertical sounding and vice versa.

According to still another feature of my invention, the electronic amplification control device is automatically switched on and off, in dependence upon the inclination angle of the sonic beam. Within the angular range in which the electronic device is switched on, a further adjustment, in principle, is not necessary; that is, a single on-off switching suffices to obtain one of the improvements according to the present invention. However, a further improvement is attained by making the electronic device additionally controllable within the angular range in which it is switched into action, so that the amplifier characteristic is dependent upon the change of sonic beam inclination within the angular range in which the electronic amplification control device is in operation.

The above-mentioned and further objects, advantages and features of my invention, said features being set forth with particularity in the claims annexed hereto, will be apparent from, and will be described in, the following with reference to the accompanying drawings in which:

FIG. 1 shows diagrammatically a vertical section through a region in the sea ahead of a fishing vessel for explaining the tracking of a school of fish by means of a tiltable sounding beam.

FIG. 2 is an explanatory diagram indicating schematically some of the comprehensive echo voltages expectable from soundings as represented in FIG. 1.

FIG. 3 is another explanatory diagram showing by comparison with FIG. 2 a correction of the echo voltages obtainable by virtue of the invention.

FIG. 4 are graphs of four different examples of amplifier characteristics suitable for the purposes of the invention.

FIG. 5 is similar to FIG. 1 in showing diagrammatically a vertical section of a sounding region ahead of the fishing vessel, except that the soundings are performed with a transducer having a larger beam angle and under conditions where the sound waves may penetrate more deeply into the sea bottom.

FIG. 6 is a schematic diagram relating to comprehensive echo voltages expectable under conditions respresented in FIG. 5.

FIG. 7 shows for comparison a group of echo voltages with details emphasized in accordance with the invention.

FIG. 8 shows four diagrams of respective amplifier characteristics suitable for the purposes of the invention.

Figure 9:
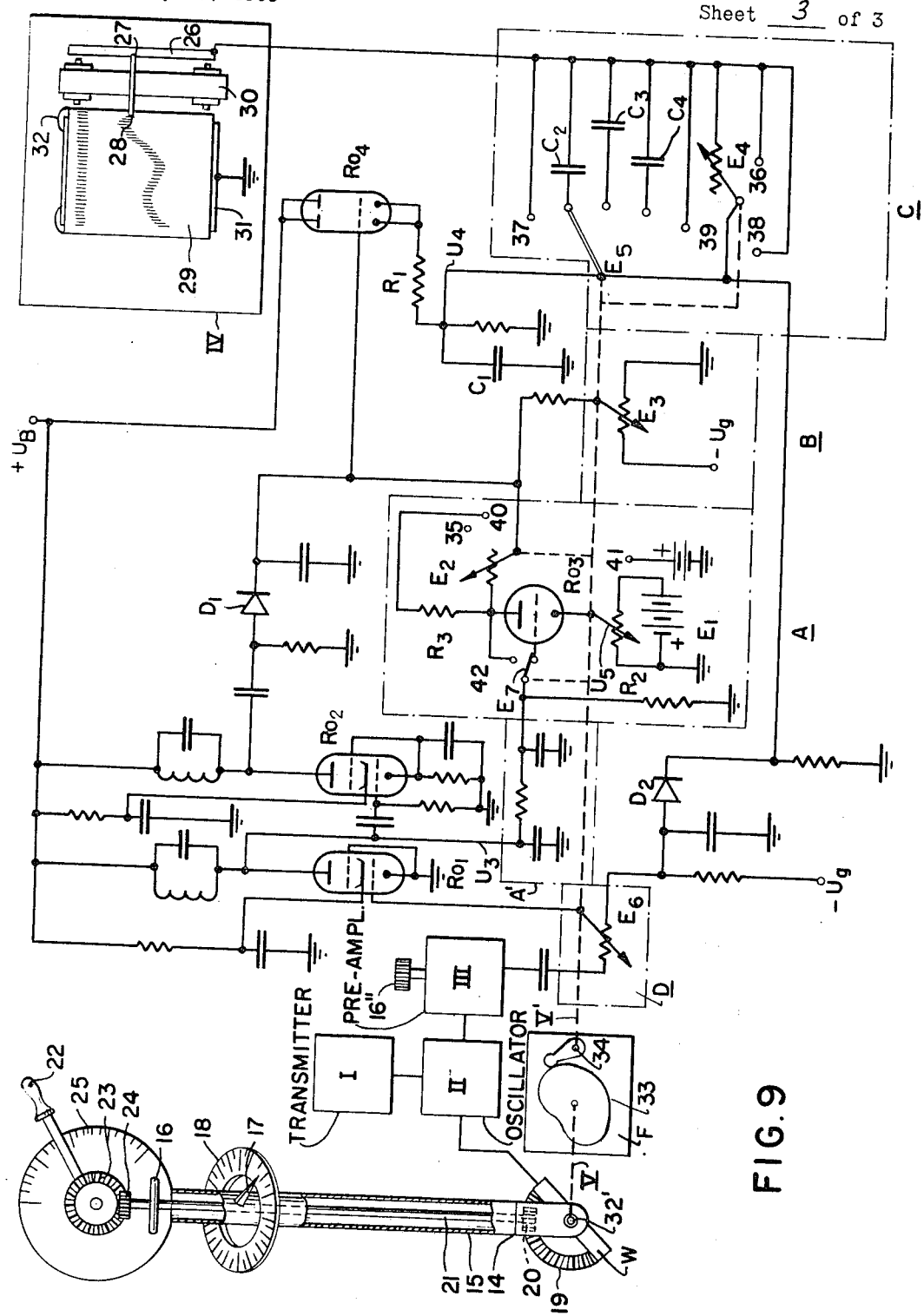
FIG. 9 is a schematic circuit diagram of echo sounding equipment according to the invention which comprises embodiments of devices for obtaining different controlled amplifier characteristics according to FIGS. 4 and 8.

Referring to the diagrammatic representation of sounding conditions shown in FIG. 1, there is illustrated a fishing vessel 1 equipped with echo sounding apparatus for searching and tracking with respectively different inclinations of the sonic beam issuing from the transducer. A few of the beam directions are schematically shown at $a$ to $d$. The sea bottom 3 is assumed to be relatively hard with respect to the reflection of sound. Indicated at 5 is a school of fish which is being tracked continuously while the position of the school relative to the vessel changes due to continuing travel of the vessel. Since for explaining the performance of the invention only the relative position between vessel and school is essential, the illustration shows the fishing vessel 1 stationary and the school 5 in changed positions and distances relative to the vessel. Analogously, the following description of the individual sonic beam directions $a$ to $d$ will be given in the reverse order, shifting from vertical to horizontal sounding.

Before further dealing with FIG. 1 and the diagrams of FIGS. 2, 3 and 4, a brief description of FIG. 5 appears helpful. In FIG. 5, the sounding conditions correspond to those of FIG. 1. The individual beam directions are denoted by $e$ to $h$, the sea bottom 4 is assumed to be soft with respect to the reflection of sound. A school of fish is denoted by 6. In all other respects the conditions exemplified by FIG. 5 correspond to those mentioned above with reference to FIG. 1.

The embodiment upon which FIGS. 1 to 4 are predicated will now be described in detail. In order to clarify the most essential aspects, the assumption is made that FIG. 1 relates to echo sounding with a relatively small opening angle of the issuing sonic beam and that the sea bottom is relatively hard with respect to sonic reflection. This will permit first dealing only with the amplitude distribution upon sea bottom and school of fish in dependence upon the inclination angle of the beam or transducer. For the purpose of explanation it is further assumed that the reduction in echo amplitudes resulting from an increase in distance between target and transducer is equalized for all angles of inclintion by a corresponding automatic or manual regulation of the amplifying gain in the receiving amplifier of the echo sound equipment.

Based on these assumptions, the vertical sounding represented by beam $a$ in FIG. 1 results in the receipt of echo voltages shown as rectangular pulses at $a_2$ in FIG. 2. It is characteristic of these pulses that the fish amplitude $F_1$ is considerably smaller than the bottom amplitude $B_1$. This has the consequence that both amplitudes cannot be recorded simultaneously on electrically sensitive paper because the paper is burned by the bottom echo and the resulting soiling of the stylus also obscures or blurs the adjacent recording of the fish echo, thus rendering it indiscernible. If one adjusts the amplifying gain to the bottom amplitude $B_1$, the fish amplitude $F_1$ stays below the response threshold of the indicating or recording device so that the fish echo remains undetected.

There are known ways of correcting such amplitude relations. The bottom echo can be fully suppressed or be reduced to an amplitude close to that of the fish echo so that both ($F_2$, $B_2$ in FIG. 3) can be recorded within the blackening range (gray graduation) of the electrically sensitive recording paper. Various threshold value devices are known for this purpose, and in FIG. 9 there is also shown a device which imparts to the amplifier characteristic a shape, exemplified at $a_4$ in FIG. 4, well suitable for selective bottom echo reduction. Such a characteristic comes about as follows.

If the input voltage $U_E$ of the receiving amplifier system increases above a given threshold value $S_1$ (FIG. 4), a threshold member within the circuitry of the amplifier becomes effective to reduce the amplified output voltage $U_A$ to a lower value $U_1$. As a consequence, there occurs an amplitude reversal of the two echoes schematically represented at $a_3$ in FIG. 3. Now the actually weaker fish echo, being the echo of interest, preponderates over the bottom echo $B_2$ in the record produced. Furthermore, the value of the voltage $U_1$ can be so chosen that both amplitudes are accommodated within the blackening range of the electrically sensitive paper.

When passing from vertical sounding $a$ (FIG. 1) to the shallower beam directions $b$ to $d$, the amplitude relations between fish echo and bottom echo change because the reflectivity conditions improve for the fish but worsen for the bottom. This will be understood from the following. Relative to the wave lengths of sound, the sea bottom may be assumed to be planar. Some of the sonic energy impinging upon the sea bottom at an acute angle of inclination is reflected from the sea bottom in the direction away from the transmitting transducer at an angle of reflection equal to the angle of incidence. These portions of sonic energy reflected in unfavorable directions are schematically indicated at $b''$, $c''$ and $d''$ in FIG. 1. The corresponding amounts of emitted energy are not utilized in the sonar receiver. In contrast thereto, fish have a size in the same order of magnitude and hence, by comparison with the sea bottom, are small relative to the sonic wave length. Consequently the reflection of fish sonically irradiated, particularly from the front, improves with increasing distance from the vessel, essentially due to the effect of the thickness of the fish. As a consequence, the fish and bottom echo amplitudes become more and more equal with increasing distance up to a point where both have approximately the same amplitude ($b_2$, $c_2$ in FIG. 2). Simultaneously the bottom echo becomes prolonged with increasing distance. The latter effect can be utilized to advantage as will be explained with reference to the embodiment of FIGS. 5 to 8, but is not taken advantage of in the embodiment presently described with reference to FIGS. 1 to 4.

According to the invention, the threshold value $S_1$ of the echo voltage $U_E$ (FIG. 4) to be amplified is automatically adjusted to a higher value $S_2$ when the beam angle changes from $a$ to $b$ (FIG. 1). This has the result that when the beam direction is changed, the fish echo in the recorded indication will always appear as the strongest echo. Hence, echoes only slightly above the fish echo, for example echoes stemming from soft bottom strata and the like, become more clearly distinguished from fish echoes. By virtue of the invention, this differentiating indication can be tuned so sharply, that the fish echo $F_3$ will be recorded with preference even under beam angle conditions where the fish-echo and bottom-echo amplitudes become largely similar. A fixed threshold value should not be set too closely above the fish echo for reasons of reliability. By virtue of the invention it is further prevented that despite the threshold device, the bottom echo will suddenly again become more strongly indicated than the fish echo, as may happen if a single threshold value is fixed for all beam inclinations. Consequently, the user of equipment according to the invention need never evaluate the echo recordings for changes in operating conditions, as the fish echo is always the one more strongly recorded.

If desired, the value $U_1$ or $U_2$ down to which the bottom echo is reduced by the threshold-value device, may be varied in dependence upon the angle of inclination of the sonic beam. This has the advantage that an optimal blackening range is always available on the recording paper for the echo recordings.

When the amplitude $F_5$ and the amplitude $B_5$ of the bottom echo (FIG. 3) are equal, a threshold device can no longer distinguish between them. The threshold device, for example if the amplitude of the amplifier output voltage is kept constant by automatic feed back regulation of the amplifying gain, would then respond to both echoes and would completely extinguish both echoes or reduce both to a lower amplitude. By virtue of the invention such faulty operations are prevented since the threshold device is automatically controlled to become inactive in dependence upon the angle of beam inclination. When the sounding beam directions change in the reverse sequence from horizontal sounding to vertical sounding, the threshold device according to the invention is automatically switched back into operation. For example when operating with the beam angle direction $c$ (FIG. 1), the amplifier characteristic remains uninfluenced by the threshold device. Accordingly, in FIG. 3 there appears at $c_3$ the same echo as shown at $c_2$ in FIG. 2. The flattening at the top 6 ($c_4$ in FIG. 4) of the amplifier characteristic when threshold device is switched off can be obtained, for example, by connecting a resistor in series with the recorder stylus in the writing circuit, such a series resistor being known for widening the control range of an echo sounding amplifier.

As the beam direction is changed to a shallower angle, the amplitude of the fish echo $F_6$ (FIG. 2) will ultimately preponderate over the bottom echo $B_6$. A comparison of the corresponding echo voltages $a_2$ and $d_2$ in FIG. 2 shows that the amplitude relations have become reversed. Consequently an amplifying characteristic according to curve $a_4$ (FIG. 4), despite its advantage for vertical sounding, produces false results when kept effective during horizontal sounding and would nullify the entire additional expenditure made for rendering the echo sounding equipment suitable for horizontal sounding. That is, a characteristic as shown at $a_4$ would suppress the fish echoes $F_6$ although these are the ones of interest, thus defeating the purpose of the echo sounding equipment. In contrast thereto, an amplifying characteristic resulting by virtue of the invention and exemplified at $c_4$ in FIG. 4 would already be suitable for representing and recording such echo signals as shown at $d_2$ (FIG. 2).

For further improvement, a device for offering a lower threshold value $S_3$ of echo voltage (FIG. 4) may be provided so that only echo amplitudes above a given voltage value can be recorded. This threshold value, of course, must be located above a minimum determined by the sensitivity of response of the indicating and recording device. By virtue of the threshold device, a given noise level and/or also the bottom echo $B_6$ are blocked off, at least to a large extent, so that the fish echo $F_7$ (FIG. 3) is well emphasized on the recording.

Preferably such a threshold value is made effective at a relatively large inclination angle of the sounding beam, for example beginning with the beam direction shown at $b$ in FIG. 1. In this case the fish echo amplitude $F_3$ (FIG. 2) is located between two threshold values, a larger and a smaller value, and thus appears particularly clear and contrasted on the recording chart. Since the noise level increases with increasing shallowness of the beam inclination, it is advantageous to also vary the lower threshold value in dependence upon the inclination angle $a$ of the beam direction.

It is further of advantage to also provide for inclination-responsive control of the above-mentioned series-connected resistance in the writing circuit, which causes the flattening (at 6 in FIG. 4) of the amplifying characteristic according to curve $c_4$. Preferably, the resistance in the writing circuit is made automatically controllable, for example by switching the resistance device on and off. By such a simultaneous control of a threshold device and a resistance device, the peaks of the echo voltages, and consequently the most interesting echo details, can be made distinct to an optimal extent from disturbing or noise echoes at any beam angle, so that essentially only these voltage peaks and consequently the echo details themselves, are preferentially indicated or recorded.

As briefly mentioned above, the sounding conditions and the embodiment of the invention upon which FIGS.

to 8 are based, involve using a transducer having a larger beam opening angle, that is a broader directional characteristic of the sonar beam, and relate to a sonically soft sea bottom so that the sound waves can appreciably penetrate into the bottom. For both reasons, the echo signals are prolonged. This makes it considerably more difficult to interpret the individual echoes, particularly to distinguish schools of fish from the sea bottom. The example now to be described will illustrate how, under such unfavorable sounding conditions, the invention affords setting a dragnet onto a school of fish without detracting the attending personnel's attention from the main task of steering the vessel and servicing the catching equipment.

The receiving amplifier of the sounding equipment is given an amplifying characteristic which depends upon the duration of the echoes or upon time portions of a comprehensive echo signal. The means for securing such a characteristic will be described hereinafter with reference to FIG. 9. Such means, for example, comprise combinations of networks and/or gain regulating means having respectively different time constants so that short-lasting echo details are recorded with greater contrasts than longer details. According to another feature of the invention, the time constants of at least one RC-network and/or gain regulating device are automatically controllable in dependence upon the beam inclination angle.

For the purpose of explanation let us first assume that the sounding equipment is provided with a conventional automatic regulation of the amplifying gain so that the amplifier output voltage $U_A$ stays substantially at a given value regardless of the target distance, this being the case in the schematic representations of FIGS. 6 and 7. Again starting from vertical sounding, and in comparison with beam $a$ in FIG. 1, it will be seen that the unfavorable amplitude relation shown at $a_2$ (FIG. 2) is also involved in the voltage course of the comprehensive echo signal schematically represented at $e_6$ in FIG. 6. The amplitude of the fish echo $F_8$ is considerably smaller than that of the bottom echo $B_8$, so that amplifying gain regulation alone cannot produce satisfactory recordings.

For the purposes of the invention, the receiving amplifier is provided with a threshold device resulting in an amplifier characteristic as exemplified at 7 in the diagram $e_8$ (FIG. 8), generally corresponding to the diagram $a_4$ (FIG. 4). In addition, however, the invention, as represented in FIGS. 5 to 8, is predicated upon the recognition that the duration of the fish echo $F_8$ is greatly different from that of the bottom echo $B_8$ so that a time-dependent amplifying characteristic can be used to obtain a characteristic as shown at 8 in diagram $e_8$ (FIG. 8). As a result, the schools of fish are more greatly emphasized. For examle, the echo voltage may now appear as shown at $e_7$ (FIG. 6) and will afford a sufficiently detailed recording of the comprehensive echo signal. Means for receiving a suitable time-dependent amplifying characteristic are known as such, and such means will also be described hereinafter with reference to FIG. 9.

As mentioned, it is another improvement feature of the invention that the dependence of the amplifying characteristic upon the duration of the echo signals is secured by coupling the amplification control means with the control device for varying the inclination angle of the sounding beam so that there exists a constrained adaptation of the time dependence upon the changes in sounding conditions occurring with a change in beam inclination. The change in echo signals occurring with a change in beam inclination is represented by FIG. 6 in correlation to selected examples of inclination angles shown at $f$ to $h$ in FIG. 5.

It will be seen that, as the inclination becomes more shallow and approaches horizontality, the duration of the bottom echo and fish echo increases, so that the advantages initially existing with vertical sounding as a result of a different amplifying gain according to curves 7 and 8 for respectively different echo pulse durations is not preserved. It has been found in practice that the echoes will be prolonged by as much as about 20 times the original duration (at vertical sounding). Consequently, continuous manual adjustment would be necessary, requiring continuous personal action at a time when pursuing a school of fish and floating the net upon the school demands undivided attention. Furthermore, the large amount of work then involved and the sometimes poor visibility on the bridge of the vessel, militate against applying sufficient care within the short time available, to always manually adjust optimal amplifying characteristics throughout a tracking period comprising a multiplicity of sounding cycles. In reality such a continuous manual activity is hardly ever performed.

By virtue of the invention, however, an optimal setting of the amplifier characteristic is always automatically secured for any sounding operations, since the control of the amplification results constrainedly for the geometry of the soundings. However, it is not always necessary to provide for continuous amplifiaction control of extremely accurate dependence upon changes in the geometric conditions, but often suffices to provide only for switching in one or a few graduated steps dependent upon angular changes in beam inclination, in order to secure to a satisfactory extent the performance desired by the invention. For example, it suffices to provide the above-mentioned RC-network, having a given behavior with respect to its time constants, so that for each inclinaion angle those echoes whose duration is shorter than that of the bottom echo are amplified to a larger extent than the bottom echo itself. This requirement is readily met by automatic control of the electric time constants, i.e., by varying the parameter value of the circuit member or members upon which the time constant of the RC-network depends.

If a more accurately optimal recording under all possible sounding conditions is desired, a cam mechanism may be interposed between the inclination control device and the electrical amplification control means as will be further described with reference to FIG. 9. With such a mechanism, the cam or cams may be made exchangeable to afford a selective program or monitor control (comparable to that used in automatic home laundering appliances) in order to selectively adapt the sounding equipment to optimal performance in accordance with observation gained in actual practice. In FIGS. 5 to 8 there are shown four selected beam angular directions. If no more than four corresponding control steps are provided, they would afford a sufficient adaptation. However, the four steps represented in the illustrations may also be looked upon as being indicative of respective instantaneous conditions occurring within a continuous course of control performance.

With the beam direction $f$, the time curve of the echo voltage may be as shown at $f_6$. The fish echo $F_{10}$ is submerged in the voltage pulse of the bottom echo $B_{10}$ and constitutes only a slight proportion thereof. The threshold value device, despite its usefulness for vertical sounding at beam angle $e$, would now be detrimental because its peculiar amplifier characteristics 7 (FIG. 8) would have the effect of blurring any details in the course of the bottom echo of which the fish echo $F_{10}$ forms part. This is indeed apparent from the flattening of the bottom echo $B_9$ as compared with echo $B_8$. The failure of the threshold device when sounding at angle $f$ is due to the fact that, when the threshold value $S_4$ (FIG. 8) is exceeded by the amplifier input voltage $U_E$, a further increase in input voltage no longer results in an appreciable, if any, increase in output voltage $U_A$. Consequently, when employing the threshold value device, the fish echo $F_{10}$ would no longer be recognizable in the recording when the beam inclination is changed from vertical sounding $e$ to the angle $f$.

However, if the threshold device is constrainedly switched off as the inclination angle is being reduced, then the amplifying characteristic corresponds to the diagram $f_8$ (FIG. 8). Now the characteristic 9 for the bottom echo changes from linear amplification to a gradually limited or flattened characteristic. Such flattening is obtainable, for example, by connecting the above-mentioned resistance serially into the writing circuit. If, for echo details of shorter duration than the bottom echo, a capacitor is switched parallel to the series resistance, then these echo details, such as fish echoes, are amplified with an amplifying characteristic which, according to curve 10 (FIG. 8), involves a higher amplifying gain than corresponds to the curve 9. As a result, the echo details are recorded in augmented contrasts, for example as represented at $f_7$. The fish echo $F_{11}$ is now greatly emphasized relative to the general course of the bottom echo $B_{11}$.

When the sounding beam is given a still shallower inclination, for example as shown at $g$ in FIG. 5, then the fish echo $F_{12}$ is inherently more emphasized with respect to the bottom echo $B_{12}$ and also increases its duration. It is therefore preferable to adapt the regulating device to this changed situation. For example, by now reducing the series resistance in the writing circuit, the curve 9 (FIG. 8) can be raised to form the curve 11, so that the amplification of the fish echo $F_{12}$ (curve 12) differs less from the amplification of the bottom echo $B_{12}$, and the bottom will still appear in the recording ($g_7$).

The raising of curve 9 as well as the increase in duration from which the curve 10 results, may be extended beyond the beam direction $g$ (or curve 11, 12) so as to be also effective at still shallower beam directions such as the direction $h$ (FIG. 5). However, for examplifying further possibilities afforded by the invention, the diagram $h_8$ in FIG. 8, relating to the beam angular direction $h$, manifests another advantageous amplifying characteristic described presently.

With an echo voltage course as shown at $h_6$ (FIG. 6), the greatly expanded bottom echo $B_{14}$, as a rule, can be utilized only poorly and also interferes with clearly recording the fish echo $F_{14}$. According to the invention there is provided a threshold value device which is switched on and off in dependence upon the angle of beam inclination so as to be effective in the region of substantially horizontal sounding. Suitable also is a device in which the magnitude of this threshold value is automatically varied in dependence upon changes of the inclination angle within the activity region of this threshold device.

It will be seen from diagram $h_8$ in FIG. 8 that in this manner a lower threshold value $S_5$ is provided, in accordance with the threshold value $S_3$ in diagram $d_4$ (FIG. 4). By virtue of this minimum threshold $S_5$, the bottom echo $B_{14}$ and any noise will disappear from the recording. Such a threshold device is advantageous even if used exclusively. However, it is preferable to provide for further threshold values. Thus, the upper threshold value $S_6$ (FIG. 8) can be produced by an amplitude limiting or clipping circuit so that the fish echo $F_{15}$ (FIG. 7) is sharply defined and thus particularly well emphasized in the echogram. This is of advantage especially for horizontal sounding and with a relatively large opening angle of the sounding beam.

In this manner, the available sounding distance can be considerably increased without the necessity of using an otherwise unfavorable, narrow opening angle of the beam. This type of recording involves a loss of details but is nevertheless of advantage because it facilitates searching large areas and constrainedly occurs only under conditions where otherwise a useful recording would no longer be possible. On the other hand, when the equipment is set for steeper soundings, more greatly departing from horizontal sounding conditions and not aiming at searching or tracking at extreme distances, the device is automatically switched off so that the loss of detail in the recording is also eliminated. At which particular beam angle this switching takes place is not critical and is readily adaptable to the particular echo sounding equipment used, as well as to any special sounding purposes.

The diagram $h_8$ in FIG. 8 further shows the amplifier characteristic 13 to be so controlled as to change to a higher amplifying gain with a particularly high steepness (at 13'), as will be explained in a later place.

Referring now to FIG. 9 there is shown an echo sounding system equipped with threshold value and gain control devices operating in dependence upon the adjustable inclination angle of the receiving transducer. These inclination-controlled devices comprise:

A threshold device A for providing an adjustable and switchable threshold value, A device A' for preventing response of threshold device A when echo details are to be recorded, A threshold device B having an adjustable lower threshold value, An RC-device C which renders the amplifying characteristic dependent upon the duration of the echo voltage, A gain control device D, and A cam mechanism F interposed between the beam inclination control device and the various electrical means for controlling the amplifying characteristic.

Not all of the above-mentioned control devices are always required in one and the same sonar apparatus, but their conjoint and mutually coactive operation results in a most advantageous system according to the invention. If less exacting requirements are to be met, only one or the other of these devices may suffice, and it will be understood that each of these devices is shown and will be described hereinafter by way of example, it being readily possible and obvious to those skilled in the art to modify them in various ways.

The illustrated echo sounding system comprises a transmitter I which is controlled from an oscillator II operating to supply a keying frequency so that a strong transmitting pulse is issued at the beginning of a sounding cycle to a sonic-electric transducer W to pass through the water. The transmitter is thereafter blocked and the echo pulse received by the transducer W is passed to a pre-amplifier III. The oscillator unit II operates as a switch to alternately pass the electric pulse from the transmitter I to the transducer W and to thereafter pass the electrical echo pulses, stemming from reflection of the sonic beam by objects, from the transducer W to the pre-amplifier III. While in this embodiment the transducer W serves to transmit and receive the sound waves, it is possible and well known to employ separate transducers for these purposes.

The illustrated transducer W is mounted in a fork member 14 for inclination about a horizontal pivot axis. The fork member 14 is rotatable about the vertical axis of a tubular shaft 15. Thus, the transducer W can be given any inclination within two planes, so that any point of the water volume in the environment of the fishing vessel can be impinged upon by a sonic beam.

The upper end of the tubular shaft 15 protrudes into the servicing area, for example on the bridge of the fishing vessel, and carries a hand wheel 16 by means of which the transducer W can be turned about the vertical axis of the tubular shaft 15. The tube 15 carries a pointer 17 travelling over a fixed scale 18 of indicia on which the rotational angle can be read off. The angle of transducer inclination is adjusted by means of a gear segment 19 which is coaxially joined with the transducer W and meshes with a pinion 20 on a vertical shaft 21 traversing the tubular shaft 15 in coaxial relation thereto. In the servicing area the shaft 21 is coupled with a handle 22 through an annular gear 23 and a pinion 24 mounted on the shaft 21. When the handle 22 is being turned about its pivot, the transducer W simultaneously changes its angle of inclination indicated on a scale 25.

During a sounding cycle of the system, the echo voltage issuing from the transducer W is first amplified by the pre-amplifier III and then passes through the main receiving amplifier system and ultimately to a chart recorder IV. The pre-amplifier may be of any conevntional type and is preferably provided with means for adjusting the desired amplifying gain, for example by manual adjustment of a knob 16″. The amplified echo voltage issuing from the pre-amplifier III then passes through three cascaded stages of the main amplifier system comprising a regulating first stage with a tube $Ro1$, and a pre-stage with a tube $Ro2$ for the power-amplifying end stage which comprises a tube $Ro4$. The plate circuit of tube $Ro2$ is coupled with the grid circuit of tube $Ro4$ through a diode $D_1$ in which the comprehensive echo-signal voltage is demodulated in the manner well known from radio techniques.

The output of tube $Ro4$ is blocked off the carrier wave by means of a capacitor $C_1$. A resistor $R_1$ in the cathode circuit of tube $Ro4$ causes the control range to be widened by flattening the amplifying characteristic as typified by curve $c_4$ in FIG. 4. The writing circuit, energized by current from the end-stage tube $Ro4$, comprises a conductor bar 26, a slide brush contact 27 joined with a stylus 28 acting upon electrically sensitive recording paper 29. The stylus 28 is passed transversely across the chart paper by being attached to an endless belt 30 rotating at constant speed. During a single sounding cycle the stylus thus passes once across the chart paper. During the stylus travel, each time commencing when an echo sounding cycle begins with the transmission of a pulse from the transducer W into the water, the amplified echo signal and consequently the pulse of writing current occurs at a moment when the stylus is spaced from its starting point a distance corresponding to the distance of the target from the vessel. At that moment, a cover layer is burned away from the chart paper so that a black carbon backing is more or less exposed, thus recording a point or dash on the paper. For example during consecutive sounding cycles a curve as shown in FIG. 9 on chart 29 may be thus produced in proper distance relation to a starting mark to form an image of the sea bottom. The recorder is equipped with a metallic counter electrode 31 which forms a supporting surface for the paper and which is grounded in order to close the writing circuit. After each sounding period, the paper 29 is advanced stepwise from a supply roll 32 a distance corresponding substantially to the width of a recorded line.

The amplitude of the output voltage $U_4$ of the receiving amplifier is regulated so as to be independent of the target distance, such automatic regulating devices for compensating slow fluctuations of a carrier wave being known from radio techniques and echo sounding equipment. For this purpose, a portion of the amplifier output voltage $U_4$ is fed back to the input of the amplifier or to one or more intermediate amplifier stages. In the illustrated embodiment a feedback connection for voltage $U_4$ is shown extended to the control grid of tube Ro1 as follows: By means of a diode $D_2$, a control voltage is produced from the output voltage $U_4$. This control voltage displaces the working point of the tube Ro1 so that there will automatically result the change in amplification required for maintaining the desired amplitude of output voltage $U_4$. The consequence is the preservation of the output amplitude upon which FIGS. 2, 3 and FIGS. 6, 7 are predicated. That is, the output amplitude remains the same although with a reduced inclination of the beam angle the echo signals become weaker on account of the increased target distance.

The further gain controlling and threshold devices of the system will be described in a sequence of the diagrams $a_4$ to $d_4$ and $e_8$ to $h_8$.

There are many possibilities of controlling the amplifying characteristic of an echo signal amplifier. For this purpose, electrical control means and various circuit components may be disposed at a great variety of localities throughout the amplifier circuitry. This is exemplified by the fact that in FIG. 9 a number of electrical control means $E_1$ to $E_7$ are provided which are not necessarily required simultaneously. According to the invention these various control means are coupled or may be coupled with the above-described device for varying the inclination of the sounding beam. This is schematically represented by a shaft V. Although this shaft is illustrated as being joined with the pivot axis 32′ of the transducer W, it will be understood that it may be mechanically coupled with any other suitable locality of the inclination adjusting device. Preferably the shaft V, or other mechanical connection between the amplifying system and the inclination control device, is disposed in the vicinity of the manual control member 22 in the servicing area because the echo amplifier, as a rule, is also installed in the same area. For example, the adjusting movements of the manual lever 22 may be transmitted to a control shaft in the amplifier by means of a connecting flexible shaft (not illustrated), the shaft in the amplifier being employed for actuating or driving the electrical adjusting and/or control means for varying the amplifier characteristic with changes in the angle of inclination.

For the purposes of the invention, however, the control means for varying the inclination of the transducer W may be combined with the housing which accommodates the electronic amplifier. This is particularly simple if the transducer inclination is not changed by a mechanical transmission as illustrated but rather by electrical means such as by a servo motor system as usually needed on relatively large vessels. For example, the servicing lever 22 or a corresponding control knob or hand wheel may be disposed at the locality of the other manual controls of the echo amplifier, and may be coupled by electrical synchros or resolvers with the transducer W on the one hand and with the shaft V on the other hand.

Also applicable is a semi-automatic transmission. For example the amplifier may be provided with a scale of indicia corresponding to the scale 25 of inclination angles, and the amplifier characteristic may then be adjustable on this amplifier scale by hand independent from the angle of inclination.

The adjustment of the inclination angle by the manual member and the adjustment of the electrical control means can be readily adapted to each other so that the desired condition or value of the electrical circuit means and consequently the intended amplifier characteristic will result. Known for example are rotational potentiometers whose resistance has a given law of dependence upon the angular setting. Another way is to use a potentiometer and to obtain any desired correlation between the potentiometric adjustment and the potentiometer tap setting by use of interposed transmission gears or cam mechanisms. Such an intermediate mechanism is shown at F in FIG. 9 and in this case is employed for jointly varying all of the electrical adjusting and control means. The cam mechanism is provided with a cam disc 33 fastened on the shaft V and engaged by a follower 34 which is coupled with the shaft V′ of the electrical control means. The electrical control means may also become coupled with the shaft V′ only after the shaft has moved through a preselected or selectable angle. For example, the shaft V′ may have entrainer dogs which entrain the electrical control components only after the shaft has passed through a given angle of rotation.

As mentioned, the cam 33 may be made exchangeable so that a program or monitor control is afforded for optimal adaptation of the amplifier characteristic to the particular sounding conditions. As shown, the shaft V′ may also be coupled to switches. In some cases, one or a few switching steps permit achieving the advantages afforded by the invention. Thus, it suffices to provide for automatic disconnection of the threshold device A when the transducer W is given an inclination different from vertical sounding.

The device A precedes the power-stage amplifier tube $Ro4$ and operates to reduce the echo voltage when the echo input voltage exceeds an adjustable threshold value $S_1$, $S_2$ (FIG. 4) so that the amplified echo voltage $U_A$ likewise assumes an adjustable value $U_1$, $U_2$. For this purpose a tube $Ro3$ is connected parallel to the tube $Ro2$ and supplied with a suitable grid bias voltage. In principle, it has already been proposed to connect a gas-filled tube parallel to the output circuit of an amplifier, such a tube being comparable with the tube $Ro3$. Indeed for the purpose of the invention, the tube $Ro3$ may also be of the gas-filled type. More advantageous, however, is a vacuum tube because, as the diagram $e_8$ (FIG. 8) shows, it permits a better adaptation and is nevertheless sufficient if connected parallel to the output circuit of an intermediate stage ($Ro2$), since its load capacity suffices for the pulse-wise operation involved.

For controlling the tube $Ro3$, a portion $U_3$ of the echo voltage is supplied from the grid of the tube $Ro2$ to the grid of tube $Ro3$. When the voltage exceeds an adjustable bias voltage $U_5$, set by an adjusting device $E_1$ such as the illustrated voltage divider, then the tube $Ro3$ becomes conducting and closes the output circuit of tube $Ro2$ thus short-circuiting the echo voltage. As a result, the corresponding echo $B_1$, $B_3$ would completely vanish from the recording. However, by means of a resistor $E_2$ connected in the circuit of tube $Ro3$, and coupled with the shaft V' to be adjusted thereby, the occurrence of still recordable residual amplitudes $U_1$, $U_2$ can be secured. The adjusting device $E_1$, namely the tap of the potentiometer is coupled with the shaft V', so that the threshold values $S_1$, $S_2$ will result.

Variable resistor $E_2$ has a switch by means of which the threshold device A can be completely disconnected, in accordance with the diagram $c_4$. Such resistance and switch combinations are known and commercially available for radio purposes, such as for volume control and switching of the current supply to a radio receiver. It will be understood that with the aid of the threshold device A a constrained control of the amplifier characteristic in dependence upon the angular beam inclination can be effected in accordance with the characteristics $a_4$, $b_4$, $c_4$, thus obtaining a complete embodiment of the invention without the necessity of using or providing the other auxiliary regulating and adjusting device still to be described. If the equipment is provided only with the device A, the switch contacts 40, 41 and the device A' are not used and hence may be absent.

When the beam inclination becomes shallower, the threshold device A is switched off by means of the device $E_2$ whose movable contact then passes onto the off contact 35. As a result, the amplifier assumes the characteristic shown at $c_4$ (FIG. 4). The flattening of the characteristic is effected, as mentioned, by a resistor $R_1$ in the output circuit of the end stage. Due to the presence of resistor $R_1$ there results a large control range for the writing current without the danger of excessively burning the chart paper in recorder IV.

The device D permits obtaining a characteristic of the type shown at $d_4$ (FIG. 4). Such a device is known as such for the purpose of adjusting the working point of the power amplifier tube $Ro4$. The electrical adjusting means of the device B is constituted by a potentiometer $E_3$ which taps an adjusted but normally fixed basic grid bias from a voltage $-U_g$. By means of the adjusted bias voltage and due to the coupling of potentiometer $E_3$ with the control shaft V', the working point of the tube $Ro4$ can be shifted further to the lower knee of the tube characteristic in dependence upon the angle of inclination of the sonic beam, so that the tube $Ro4$ operates as a class C amplifier with a characteristic as shown at $d_4$. The coupling between the displaceable tap contact of potentiometer $E_3$ and control shaft V' is such that the tap contact is entrained only for passing from characteristic $c_4$ to $d_4$. Thereafter a steady, coupled adjusting motion may follow, as well as further singular or repeated switching operations. As a result, the threshold value $S_3$ of characteristic $d_4$ (FIG. 4) is correspondingly displaced. For many purposes, however, a single setting of a fixed threshold value $S_3$ is sufficient.

The component devices of the system described in the following exemplify adjusting and control means suitable for providing amplifying characteristics as explained above with reference to FIGS. 5 to 8.

As shown in FIG. 9, an RC-network A' is added to the threshold device A on the control side of the latter. The network A' serves to secure a characteristic as shown at $e_8$ (FIG. 8). For this purpose, the time constant of network A' is such that echo details ($F_8$) cannot reach the control input of the threshold device A, that is, echo details are not applied to the grid of tube $Ro3$. The threshold device A therefore does not respond to the echo details even if the amplitude of these details exceeds the threshold value. This results in a subdivision of the amplifier characteristic into a base characteristic 7 for the bottom echo $B_8$ and another characteristic 8 for the fish echo $F_8$ (FIG. 8).

The device C serves to produce characteristics of the type shown at $f_8$ and $g_8$ as well as non-illustrated intermediate stages. For this purpose, the device C is equipped with adjusting means $E_4$ and $E_5$ coupled with the control shaft V'. The adjusting means $E_4$ is an adjustable resistor series connected in the writing circuit for flattening of the writing voltage reaching the recorder IV. In order to pass from characteristic $e_8$ to $f_8$, the threshold device A is switched off and the series resistor $E_4$ is switched on, the switch being actuated by a dog which couples it to the shaft V'. This results in an amplifier characteristic as shown at 9 (FIG. 8). To provide for the characteristic $e_8$, the switch $E_5$ has a contact 37 and the rheostat $E_4$ a switch contact 36, both contacts being normally active so that device C is normally turned off and is switched on only when passing from $e_8$ to $f_8$.

When the threshold device A is switched off, the network A' is also inactive, and the splitting into two amplifier characteristics is then effected by the coupled switch $E_5$ which selectively connects capacitors $C_2$ to $C_4$ in shunt relation to the series resistor $E_4$. Relative to echo details, the shunt connection of these capacitors renders the series resistor $E_4$ ineffective, so that the flattening of curve 9 does not occur for such details. The amplifier characteristic applying to these echo details is then in accordance with curve 10 and corresponds to the one effective for the entire echo signal without the presence or effect of the device C. When passing from beam inclination to $f$ to $g$ and hence from characteristic $f_8$ to $g_8$, the increase in duration of the echo detail is equalized by the fact that a capacitor of greater capacitance is switched into parallel relation with the rheostat $E_4$ by operation of the switch $E_5$.

The time constant sequentially active in devices A' and C may vary in the ratio of 1:20 and more, depending upon the beam inclination. For amplification of the bottom echo a reduction of the resistance value of $E_4$ results for $g_8$ in the characteristic 11. An increase of the shunt-connected capacitance by means of switch $E_5$ has the effect that the characteristic 10 most favorable for fish echoes will remain preserved in $g_8$, as is indicated by the characteristic 12 in FIG. 8.

The amplifier characteristic according to $h_8$ may be realized, for example, by the fact that, when passing from $g_8$ to $h_8$, the device C is switched off by shifting of the slide contact on rheostat $E_4$ to the fixed off contact 38 and by shifting of the selector switch $E_5$ onto the off contact 39. Simultaneously the device D for adjusting the lower threshold value $S_5$ enters into operation if in device D the adjusting means $E_6$ is entrained. This adjusting means $E_6$ is a potentiometer for setting the amplifying gain and is coupled to the control shaft V' when passing from $g_8$ to $h_8$. Thus a reduction in beam inclination is automatically accompanied by setting the amplifier to a larger amplifying gain.

The resulting effect also increases the steepness of the amplifying characteristic in the ascending range 13' (FIG. 3). Nevertheless, overcontrol can be reliably avoided by again switching a threshold device into operation, if desired in addition to the above-described feedback regulation derived from the output voltage $U_4$, so that the topped-off voltage course 13 (FIG. 8) will result. Used for this purpose may be the same threshold device A that serves to obtain characteristic $e_8$. For this purpose, in the illustrated embodiment, the device $E_2$ is given a switching position 40 in which it is connected with a fixed anode resistance $R_3$; and the timing network A' together with the grid resistor $R_2$ is disconnectable from the grid of the tube $Ro3$ by placing the switching device $E_7$ to the switching position 42. The tube $Ro3$ then operates as a diode with a fixed grid bias from the voltage supply device $E_1$ then in switching position 41, so that, in conjunction with the anode resistance $R_3$, the threshold value $S_6$ will result.

The invention is not limited to the illustrated embodiments of the system components. The individual component devices shown in FIG. 9 may each be modified or may be used in any desired number or various other combinations for achieving the objectives of the invention. There are, for example, numerous other ways of providing an adjustable voltage divider coupled with the device for controlling the inclination of the sounding beam, and having the voltage divider control the effect of an electronic device upon the course of the amplifier characteristic in dependence upon the inclination angle. Any such voltage divider may be coupled with the above-mentioned control shaft V' or with the shaft V or any other mechanical part moving in constrained relation to the changes in beam inclination.

There are known echo sounding devices in which a group of fixed transducers is provided and the direction of the sounding beam is changed with electrical means, for example phase-shifting networks supplied with two input voltages. The change in beam direction in such systems, of course, is also controlled by some mechanical or electrical adjustment acting upon the phase-shift means; and it will be understood that the present invention is analogously applicable to systems of the latter type by coupling the electrical control components of the amplifier with the device for electrically controlling the inclination of the beam direction in order to thereby modify the amplifier characteristic to attain the objects of the present invention.

The invention may also be applied in systems which contain various auxiliary or accessory devices and components, for example a device which improves the echo indication for example during horizontal sounding, which device may then be switched on and off or otherwise controlled according to the invention in dependence upon the angle of beam inclination. Thus, it is of advantage to vary in this manner the sonic frequency with changes in the angle of inclination. For horizontal sounding a relatively low frequency of the sounding cycles, for example 10,000 c.p.s., is favorable to afford tracking of objects at large distances. With such a frequency, however, the sound waves tend to undesirably penetrate too deeply into the sea bottom at vertical sounding. For vertical sounding, therefore, a higher frequency, for example 30,000 c.p.s. and more, is preferable. Such shift in frequency may also be effected according to the invention in automatic response to changes in beam regulation.

To those skilled in the art it will be apparent from the foregoing that my invention is amenable to a great variety of modifications and hence may be given embodiments other than particularly illustrated and described herein, without departing from the essential features of my invention and within the scope of the claims annexed hereto.

I claim:

1. In apparatus for underwater echo sounding having sonic-electric transducer means, an amplifier system connected to said transducer means to receive echo voltages therefrom, said amplifier system comprising control means for varying the shape of the amplifying characteristic of said amplifier system, said amplifying characteristic being output voltage versus input voltage of said amplifier system, and indicator means connected to said amplifier system and controlled thereby, the combination of a beam inclination control device for changing the inclination angle of the sonic beam issuing from said transducer means, and means coupling said control means to said inclination control device for adapting the amplifying characteristic to changes in sounding conditions caused by changes in beam inclination.

2. In echo sounding apparatus as claimed in claim 1, said control means comprises an electronic shaping device for modifying the shape of the amplifying characteristic of said amplifier system in dependence upon the echo voltage amplitude.

3. In echo sounding apparatus as claimed in claim 1, wherein said control means comprises an adjustable potentiometer having a movable tap contact and being coupled to said inclination control device whereby the shape of the amplifying characteristic of said amplifier system is varied by inclination-responsive relative displacement of said contact.

4. In apparatus for underwater echo sounding having sonic-electric transducer means, an amplifier system connected to said transducer means to receive echo voltages therefrom, and chart recorder means connected to said amplifier system and controlled thereby, the combination of a beam inclination control device for changing the inclination angle of the sonic beam issuing from said transducer means, said amplifier system comprising control means for varying the amplifying characteristic in adaptation to changes in beam inclination, said control means having switch means coupled with said inclination control device to be switched into and out of action in dependence upon the inclination angle of the beams.

5. In echo sounding apparatus according to claim 4, said control means comprising a threshold device, said switch means being connected with said threshold device for switching it to active condition in dependence upon said inclination control device being set to a given range portion of shallow inclination angles, said threshold device being controllable by said inclination control device in dependence upon inclination changes within said range and having a minimal threshold value for echo voltages so that substantially only echo voltages above said value are recorded on said recorder means.

6. In echo sounding apparatus according to claim 5, said control means comprising another threshold device for providing a maximal voltage value to upwardly limit the amplification of the echo voltages, and means for activating said other threshold device in dependence upon said inclination control device being set to given shallow beam inclination angles.

7. In apparatus for underwater echo sounding having sonic-electric transducer means, an amplifier system connected to said transducer means to receive echo voltages therefrom, and chart recorder means connected to said amplifier system and controlled thereby, the combination of a beam inclination control device for changing the inclination angle of the sonic beam issuing from said transducer means, said amplifier system comprising a threshold-voltage device for limiting the echo-voltage amplitude range within which the echo voltage is amplified, and switch means coupled with said inclination control device and connected with said threshold voltage device for rendering it active and inactive in dependence upon the inclination angle of the beams.

8. In apparatus for underwater echo sounding having sonic-electric transducer means, an amplifier system connected to said transducer means to receive echo voltages therefrom, and chart recorder means connected to said amplifier system and controlled thereby, the combination of a beam inclination control device for changing the inclination angle of the sonic beam issuing from said transducer means, said amplifier system comprising gain control means coupled with said inclination control device for varying the amplifying characteristic of said system in dependence upon changes in beam inclination, and switch means connected with said gain control means and coupled with said inclination control device for switching said gain control means into active condition for a given partial range of beam inclination.

9. In apparatus for underwater echo sounding having sonic-electric transducer means, an amplifier system connected to said transducer means to receive echo voltages therefrom, and chart recorder means connected to said amplifier system and controlled thereby, the combination of a beam inclination control device having a continuously rotatable and manually operable control member for continuously changing the inclination angle of the sounding beam between vertical and nearly horizontal positions, incremental control means for intermittently varying the shape of the amplifying characteristic of said amplifier system in given graduated steps for adaptation to changes in beam inclination, and coupling means connecting said control means to said inclination control device for actuating said control means in dependence upon the beam direction being set to given ranges of inclination.

10. In apparatus for underwater echo sounding having sonic-electric transducer means, an amplifier system connected to said transducer means to receive echo voltages therefrom, said amplifier system comprising control means for varying the amplifying characteristic of said amplifier system and indicator means connected to said amplifier system and controlled thereby, said indicator means comprising a chart recorder for electrically sensitive record carriers and having a writing circuit to receive writing current from said amplifier system, said control means comprising controllable resistance means series connected between said amplifier system and said chart recorder for varying the writing current, the combination of
 a beam inclination control device for changing the inclination angle of the sonic beam issuing from said transducer means; and
 coupling means coupling said control means to said inclination control device for adapting the amplifying characteristic to changes in sounding conditions caused by changes in beam inclination.

11. In echo sounding apparatus as claimed in claim 10, wherein said control means comprises capacitor means and switch means for connecting said capacitor means in parallel to said series resistance means in dependence upon the beam inclination, for emphasizing recorded echo details.

12. In apparatus for underwater echo sounding having sonic-electric transducer means, an amplifier system connected to said transducer means to receive echo voltages therefrom, said amplifier system comprising control means for varying the amplifying characteristic of said amplifier system, said control means comprising a timing network for varying the amplifying characteristic in dependence upon the duration of the echo voltage signals, and indicator means connected to said amplifier system and controlled thereby, the combination of
 a beam inclination control device for changing the inclination angle of the sonic beam issuing from said transducer means; and
 coupling means coupling said control means to said inclination control device for adapting the amplifying characteristic to changes in sounding conditions caused by changes in beam inclination.

13. In echo sounding apparatus as claimed in claim 12, wherein the timing network of said control means comprises an RC member controlled by said coupling means to vary its time constant in dependence upon the beam inclination.

14. In echo sounding apparatus as claimed in claim 12, wherein said amplifier system has an amplifying stage of which the timing network of said control means forms part, said amplifying stage having due to said inclination-controlled network a time constant increasing with increased shallowness of the beam inclination.

15. In echo sounding apparatus as claimed in claim 14, wherein said control means comprises amplifying gain control means also coupled with said inclination control device for varying the gain conjointly with the variation of said time constant.

References Cited

UNITED STATES PATENTS

| | | | |
|---|---|---|---|
| 2,825,884 | 3/1958 | Frylund | 340—3 |
| 2,865,014 | 12/1958 | Malm | 340—3 |
| 3,038,142 | 6/1962 | Wippert | 340—3 X |

RICHARD A. FARLEY, *Primary Examiner.*